United States Patent Office 3,497,450
Patented Feb. 24, 1970

3,497,450
REMOVAL OF LIQUID CONTAMINANTS FROM THE SURFACE OF WATER
Sorrell Roth, Irvington, N.J., assignor to Allied Chemical Corporation, New York, N.Y., a corporation of New York
No Drawing. Filed Oct. 31, 1968, Ser. No. 772,378
Int. Cl. B01d 17/02
U.S. Cl. 210—18           5 Claims

ABSTRACT OF THE DISCLOSURE

This invention relates to a method for removing a liquid contaminant, particularly petroleum oil, from the surface of water by covering the surface of said liquid contaminant with a salt water solution and then an aqueous solution of polyvinyl alcohol and alkali metal borate so as to form a skin around the liquid contaminant. The entrapped liquid contaminant can then be removed from the water surface by various methods.

---

As larger tanker ships are being used to transport petroleum oil and other liquid products, there is growing concern over how to clean up spills which might result from accidents to these tankers.

It is an object of this invention to provide a method of removing liquid contaminants from the surface of water.

It is a more specific object of this invention to provide a method of removing oil from the surface of water.

In accordance with the present invention, it was found that a dilatant aqueous solution of polyvinyl alcohol and alkali metal borate will form a skin when added to salt water solutions. It was further found that when the above dilatant solution is poured over the surface of a body of oil floating in salt water, a skin will form on top of and around the sides of the oil bed, trapping the oil within the skin.

The method of the present invention may be used to remove liquid contaminants from the surface of water, whether salt or fresh water.

The exposed surface of the liquid contaminant is covered first with a thin film of salt water and then with the hereinafter described dilatant solution so as to form a skin around said liquid contaminant. The entrapped liquid can then be removed from the surface of the water by various methods such as by directing it into containers or by weighing it down, as with sand, so that it sinks beneath the surface of the water.

The entrapped liquid may gradually escape from the skin, but the escape is usually at a rate slow enough to enable the liquid to be thinly dispersed to the surrounding water, or in the case of hydrocarbon liquids such as petroleum oil, the slowly escaping liquid may be degraded by suitable microbes present in the water or added to the entrapped hydrocarbon liquid. Suitable microbes which may be utilized are described, for example, in Beerstecher, Petroleum Microbiology, Elseveier Press Inc., New York (1954).

Where the liquid contaminant is on the surface of sea water, there is usually enough of a salt water film on the surface of the liquid so that the dilatant solution may be added directly.

The dilatant solutions used in the practice of the instant invention are aqueous solutions comprising:

(a) from about 0.5 to about 5.0% by weight of an alkali metal borate;
(b) from about 0.5 to about 5.0% by weight of a water soluble polymer of vinyl alcohol.

The term "alkali metal borates" includes not only the alkali metal salts of the common boric acids, i.e., tetraboric acid, $H_2B_4O_7$; meta-boric acid, $HBO_2$, and orthoboric acid, $H_3BO_3$; but also of the other boric acids such as $H_2B_2O_4$, $H_2B_6O_{10}$, $H_2B_8O_{13}$, $H_2B_{12}O_{19}$, $H_6B_4O_9$, and $H_6B_8O_{15}$. With the exception of meta- and orthoborate salts, such alkali metal borates have the general formula:

$$M_2O \cdot mB_2O_3$$

wherein M denotes an alkali metal and $m$ can range from 1 to 4. Hydrates of any of the foregoing borate salts are also suitable. The preferred borate is borax, i.e., sodium tetraborate decahydrate.

The term "water soluble vinyl alcohol polymer" embraces vinyl alcohol polymers having up to 50% of the hydroxyl groups thereof replaced by methoxy, ethoxy, acetyl, propionyl or butyryl radicals, i.e., partially etherified or esterified polyvinyl alcohol. Said methoxy and ether radicals can be unsubstituted or substituted with hydroxyl or carboxyl groups. Said acetyl, propionyl and butyryl radicals can likewise be unsubstituted or can be halogen or hydroxyl substituted. Preferably no more than about 20% of the polyvinyl alcohol hydroxyl groups will be replaced by any of the aforementioned ether or ester radicals.

The vinyl alcohol polymers utilized in the practice of the instant invention can, therefore, be represented by the structure:

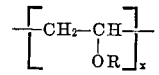

wherein $x$ can range from about 1,200 to about 5,000, preferably 1,600 to 3,000, and wherein R represents hydrogen-, methyl-, ethyl-, acetyl-, propionyl-, butyryl-, hydroxyl-, or carboxyl-substituted methyl or ethyl; or halogen- or hydroxyl-substituted acetyl, propionyl or butyryl, and wherein at least 50% of said R groups are hydrogen. As above indicated, preferably at least 80% of said R groups will be hydrogen.

The water-soluble polyvinyl alcohol polymers of the instant invention have molecular weights ranging from about 50,000 to about 450,000, preferably 70,000 to 200,000.

Polyvinyl alcohol is conventionally obtained by polymerizing esters of vinyl alcohol followed by removal of the ester groups by saponification. To prepare the polymers, wherein up to about 50% of the hydroxyl groups are ester substituted, it is merely necessary to polymerize the corresponding vinyl ester and then partially saponify the resulting polyvinyl ester and thereby remove 50% or more of the ester group. For example, to prepare polyvinyl alcohol containing 20% acetyl groups, a polyvinyl acetate polymer would be 80% saponified and the remaining 20% acetyl groups left unsaponified. To prepare the methoxy and ethoxy ether derivatives, polyvinyl alcohol having substantially 100% hydroxyl groups, is etherified up to the desired degree, i.e., up to about a maximum of 50% using conventional etherification agents such as diazomethane, dimethyl sulfate, or diethyl sulfate.

This invention can be more fully understood by reference to the following examples. All parts are parts by weight except where otherwise expressly stated. Molecular weight (MW) recited are weight average molecular weights.

EXAMPLE 1

A film of petroleum oil was floated on an exposed body of water containing 4 weight percent of NaCl. The upper surface of the oil was wetted with salt solution and the oil then covered with a thin layer of an aqueous dilatant solution. The dilatant solution contained 1.8 weight percent of sodium tetraborate decahydrate and 1.2 weight percent of a substantially unsubstituted vinyl alcohol polymer. Almost immediately a skin formed around the surface of the oil, entrapping the oil within. Sand was then added on top of the entrapped oil, sinking it beneath the surface of the water.

EXAMPLE 2

The procedure of Example 1 is repeated using the dilatant solutions listed below. Results substantially similar to those of Example 1 are obtained.

Dilatant solutions: Wt. percent
(1) Potassium tetraborate pentahydrate _____ 3.0
    100% polyvinyl alcohol, 85,000 MW _____ 3.0
(2) Sodium orthoborate _____ 1.0
    100% polyvinyl alcohol, 175,000 MW _____ 1.0
(3) Sodium metaborate _____ 4.5
    50% polyvinyl alcohol, 125,000 MW (i.e., 50% saponified polyvinyl acetate) _____ 4.5

Various modifications will be apparent to one skilled in the art, and it is not intended that this invention be limited to the details in the specific examples presented by way of illustration. Accordingly, the scope of the invention is limited only by the appended claims.

I claim:
1. A method of removing a liquid contaminant from the surface of water which comprises:
   (a) wetting the exposed surface of said liquid contaminant with salt water,
   (b) pouring an aqueous solution comprising from about 0.5 to about 5.0 weight percent of a water soluble polymer of vinyl alcohol and from 0.5 to about 5.0 weight percent of an alkali metal borate over the surface of the liquid contaminant so as to form a skin around said liquid contaminant, and
   (c) removing the skin entrapped liquid contaminant from the surface of the water.
2. The method of claim 1, wherein the skin entrapped liquid contaminant is removed from the surface of the water by adding sufficient weight to the top of the entrapped liquid to sink it below the surface of the water.
3. The method of claim 1, wherein the alkali metal borate is sodium tetraborate decahydrate.
4. The method of claim 1, wherein the liquid contaminant is a petroleum oil.
5. The method of claim 1, wherein suitable microbes are added to the entrapped oil so as to degrade said oil.

References Cited

UNITED STATES PATENTS 3,198,731  8/1965  De Lew _____ 210—42
3,265,616  8/1966  Wyllie et al. _____ 210—39

MICHAEL E. ROGERS, Primary Examiner

U.S. Cl. X.R.
210—40